June 13, 1950 — C. L. HAWKS — 2,511,469
BELLOWS TYPE SIPHON AND SYRINGE
Filed Aug. 1, 1949
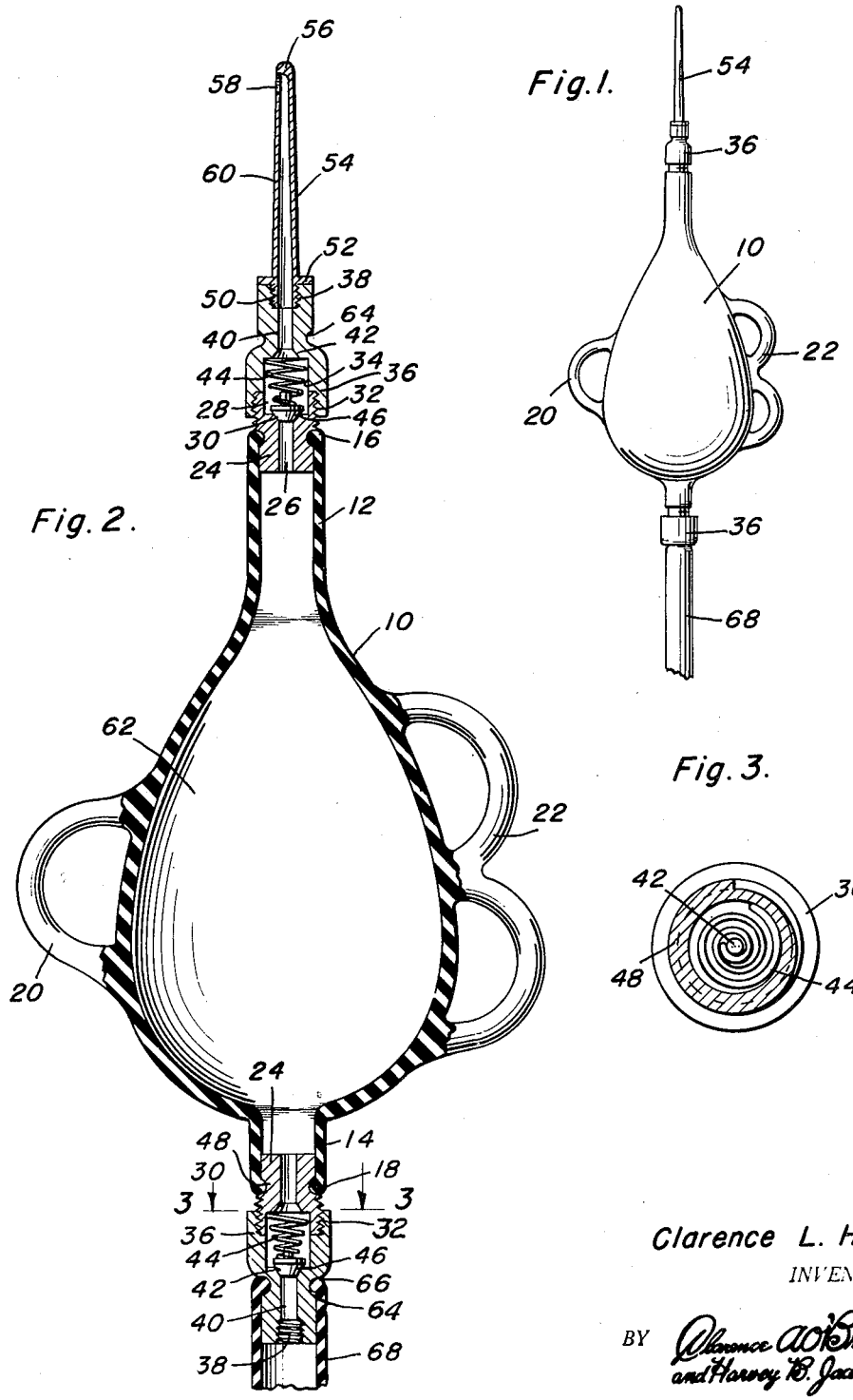
Clarence L. Hawks
INVENTOR.

Patented June 13, 1950

2,511,469

UNITED STATES PATENT OFFICE 2,511,469

BELLOWS TYPE SIPHON AND SYRINGE

Clarence L. Hawks, Fruita, Colo.

Application August 1, 1949, Serial No. 107,952

2 Claims. (Cl. 128—231)

This invention comprises novel and useful improvements in a bellows type syphon and syringe and more particularly pertains to a syphon and syringe especially adapted for dairy use for the treatment of mastitis and other infections of the udders and bags of dairy cows, by irrigation of the same with an antiseptic solution.

The primary object of this invention is to provide a veterinary syringe for dairy use for more effectively irrigating the udders and bags of cows for the treatment of mastitis, for the removal therefrom of lumpy milk and for syphoning out the antiseptic solution forced into the milk ducts for irrigating the bag.

A further very important object of the invention is to provide a bellows type of syringe particularly adapted for dairy use as aforesaid, and adapted generally for use as a syphon and syringe, which shall be of a light weight, simple and inexpensive construction, is easily manipulated by one hand of the user, is easily disassembled for cleansing or servicing, and which may be readily converted from a force discharge syringe to a draining syphon, as desired.

The foregoing, together with various ancillary objects and features of the invention which will later become apparent as the following description proceeds, are attained by the present device, a preferred embodiment of which has been illustrated by way of example only in the accompanying drawings, wherein:

Figure 1 is a side elevational view showing the preferred embodiment of the invention with a portion of a fluid delivery hose attached thereto;

Figure 2 is a vertical longitudinal sectional view through the embodiment of Figure 1 upon an enlarged scale; and Figure 3 is a horizontal sectional detail view taken substantially upon the plane of the section line 3—3 of Figure 2.

Referring now more specifically to the accompanying drawings, wherein like numerals designate similar parts throughout the various views, attention is directed chiefly to Figure 2, wherein it will be seen that the device includes a substantially pear-shaped bulb or bellows type of syringe indicated at 10, and which may be of any suitable material such as rubber or the like, and which is provided with a pair of oppositely disposed neck portions 12 and 14 upon the longitudinal axis of the pear-shaped body 10, and comprising respectively discharge and inlet passages. The outer ends of these passages are preferably inturned to form annular beads 16 and 18, respectively, by means of which a pair of valve assemblies may be removably but securely sealed and attached to the extremities of the outlet and inlet tubes 12 and 14.

Preferably integrally formed upon opposite sides of the pear-shaped body 10 and adjacent the lower end thereof are a pair of loops 20 and 22, the former being adapted to receive the thumb, and the latter having a pair of openings adapted to receive two fingers of the hand of the user, whereby the bulb may be securely gripped in the hand, and the bulb may be compressed and expanded by manipulation of the fingers in the finger loops.

The valve assemblies are of identical and interchangeable construction, and each comprises a plug member 24 which is provided with an axially disposed central duct 26 extending therethrough, this duct, at its outer end, opening into a diametrically enlarged bore 28 having a valve seat 30 formed in that portion where the bore merges with the duct.

The open outer end of the plug is provided with external screw threads 32 for engaging similar internal screw threads formed at the inner end of an enlarged bore 34 disposed centrally of a connector member 36 in the form of a sleeve or the like. At its outer end, the connector member is provided with an internally threaded bore 38 which is connected with the bore 34, as by a centrally disposed passage or duct 40, the merging of this duct 40 with the bore 34 having formed a valve seat 42 thereon, which is opposite to and identical with the valve seat 30. The bore 34, together with the complementary bore 28 forming a continuation thereof, constitutes a valve chamber in which is received a compression valve spring 44 which yieldingly urges a conventional form of valve 46 to its closed position against the seat 30. The valve 46 is selectively engageable with seats 30 or 42 in each of the two valve assemblies depending upon the direction of fluid flow desired, as set forth hereinafter.

The exterior surface of the plug 24 is provided with an annular groove or channel 48 in which are received the above mentioned annular beads 16 and 18 of the inlet and outlet passages 12 and 14.

Removably secured to the outlet valve assembly is a hollow needle having an externally threaded shank portion 50 which is received in the threaded bore 38, together with a flanged portion 52 which abuts the end of the connector 36. Extending outwardly from the flange 52 is an axial tapering hollow needle 54 which has a rounded end 56 at the tip thereof, and a fluid inlet and discharge opening 58 formed in the side of the needle adjacent the end. As shown in Figure 2, the needle has a hollow passage 60 extending therethrough which registers with the duct 40, the bore 34, the bore 28, and the duct 26, and from thence communicates with the interior of the collapsible bulb 10.

The previously described valve construction pertains to the outlet valve assembly in the arrangement shown in Figure 2, and while the parts are of identical construction, the inlet valve assembly is arranged in a slightly different manner, as shown at the lower portion of Figure 2. In this arrangement, the valve 46 is yieldingly urged against the seat 42 and the connector 36, so that the valve is inwardly opening with respect to the pump chamber 62 formed within the collapsible bulb 10. It will be noted that the valve is outwardly opening with respect to the outlet valve assembly at the upper portion of Figure 2.

Intermediate its ends, the connector 36 of the inlet valve is provided with an annular groove 64 upon its exterior surface, which is adapted to receive the internally flanged or beaded portion 66 formed at the end of a flexible hose or tube 68.

From the foregoing, the utility of the device will now be readily understood. When it is desired to dispense a fluid from a conduit 68 from any suitable source, by means of the device, through the hollow needle 54, as for supplying an antiseptic to the milk ducts and for irrigating the udders and bag of dairy cows, the device is arranged as shown in Figure 2, and the hollow needle is then inserted into the udder of the cow. The thumb is placed in the loop 20, and two fingers of the same hand are disposed in the loops 22, and the bulb is then collapsed, reducing the volume of the chamber 62 and dispelling its contents through the passage 60 of the needle 54. When the bulb is again distended, as by spreading the fingers apart, the chamber 62 is enlarged, and the pressure therein reduced below atmospheric, at which time the outlet valve 46 is held against its seat 30 by the spring 44, so that the suction in the chamber 62 opens the valve 46 of the inlet valve assembly, causing an inflow of fluid through the conduit 68 into the chamber 62. Upon the next compression of the bulb 10, the inlet valve 46 is closed against the seat 42, so that the fluid within the chamber 62 cannot return through the inlet valve assembly, whereupon the fluid, upon compression, is discharged through the outlet valve assembly and through the hollow needle.

By the foregoing, it is therefore seen that a fluid may be readily introduced into the udders of cows, or may be discharged by means of the syringe to any other place of use and for any other purpose.

When it is desired to employ the device as a syphon, and in particular to withdraw the antiseptic fluid or infected milk from the cow udders, this may be done by merely removing the respective connectors 36 from their plugs 24 which remain within the bulb passage tubes 12 and 14, and then reversing the valve and spring assemblies in each of the valve chambers, and thereupon replacing the connectors. It will now be seen that the operation of the valves is reversed so that the outlet valve assembly now becomes the inlet valve assembly, while the former inlet valve assembly becomes an outlet valve assembly. By this means, fluid may readily be withdrawn through the needle and delivered through the flexible hose 68.

Moreover, since the construction of the plugs 24, the valves 46, the valve springs 44, and the connectors 36 are identical, it is evident that each of these elements may be replaced or interchanged as desired.

From the foregoing, the construction and operation of the device will be readily understood and further explanation is believed to be unnecessary. However, since numerous modifications and changes will readily occur to those skilled in the art after a consideration of the foregoing specification and accompanying drawings, it is not desired to limit the invention to the exact construction shown and described, but all suitable modifications and equivalents may be resorted to, falling within the scope of the appended claims.

Having thus disclosed and described the invention, what is claimed as new is as follows:

1. A bellows type syringe comprising a collapsible bulb having fluid inlet and outlet passages, non-return valve assemblies connected to said passages, a fluid supply hose and a hollow needle connected to the inlet and outlet valve assemblies, respectively, each valve assembly comprising a plug having an annular groove receiving a complementary bead on the bulb, a duct extending through said plug, a connector attached to said plug, a valve chamber in said connector and a valve and valve closing spring in said chamber, said plug and said connector having valve seats, said valve being selectively engageable with one of said seats.

2. A bellows type syringe comprising a collapsible bulb having fluid inlet and outlet passages, non-return valve assemblies connected to said passages, a fluid supply hose and a hollow needle connected to the inlet and outlet valve assemblies, respectively, each valve assembly comprising a plug having an annular groove receiving a complementary bead on the bulb, a duct extending through said plug, a connector attached to said plug, a valve chamber in said connector and a valve and valve closing spring in said chamber, said plug and said connector having valve seats, said valve being selectively engageable with one of said seats, said connector having a duct therethrough, said hollow needle being detachably engageable in said last duct.

CLARENCE L. HAWKS.

REFERENCES CITED

The following references are of record in the file of this patent:

UNITED STATES PATENTS

| Number | Name | Date |
|---|---|---|
| 26,204 | Richardson | Nov. 22, 1859 |
| 33,747 | Mattson | Nov. 19, 1861 |
| 94,620 | Lockwood | Sept. 7, 1869 |
| 338,045 | Easton | Mar. 16, 1886 |
| 601,075 | Gray | Mar. 22, 1898 |
| 1,253,955 | Gallegin | Jan. 15, 1910 |

FOREIGN PATENTS

| Number | Country | Date |
|---|---|---|
| 10,382 | Great Britain | May 1, 1909 |